United States Patent
Hogervorst et al.

(10) Patent No.: US 11,388,908 B2
(45) Date of Patent: Jul. 19, 2022

(54) PROCESS FOR PREPARING FAT SLURRIES AND A PROCESS FOR PREPARING EMULSIONS OF SUCH SLURRIES

(71) Applicant: UPFIELD EUROPE B.V., Rotterdam (NL)

(72) Inventors: Wim Theodorus Hogervorst, Spijkenisse (NL); Frederik Michiel Meeuse, The Hague (NL); Abraham Leenhouts, Vlaardingen (NL); Ronald Peter Potman, Papendrecht (NL)

(73) Assignee: UPFIELD EUROPE B.V., Rotterdam (NL)

( * ) Notice: Subject to any disclaimer, the term of this patent is extended or adjusted under 35 U.S.C. 154(b) by 0 days.

(21) Appl. No.: 15/576,032

(22) PCT Filed: May 2, 2016

(86) PCT No.: PCT/EP2016/059732
§ 371 (c)(1),
(2) Date: Nov. 21, 2017

(87) PCT Pub. No.: WO2016/188709
PCT Pub. Date: Dec. 1, 2016

(65) Prior Publication Data
US 2018/0153187 A1    Jun. 7, 2018

(30) Foreign Application Priority Data
May 28, 2015  (EP) .................................... 15169579

(51) Int. Cl.
A23D 7/02     (2006.01)
A23D 7/00     (2006.01)

(52) U.S. Cl.
CPC .............. A23D 7/02 (2013.01); A23D 7/001 (2013.01); A23D 7/003 (2013.01)

(58) Field of Classification Search
CPC .......... A23D 7/00; A23D 7/001; A23D 7/003; A23D 7/005; A23D 7/0053; A23D 7/0056; A23D 7/01; A23D 7/011; A23D 7/013; A23D 7/015; A23D 7/02; A23D 7/04; A23D 7/05; A23D 7/06
See application file for complete search history.

(56) References Cited

U.S. PATENT DOCUMENTS

| | | | |
|---|---|---|---|
| 3,472,661 A | | 10/1969 | Melnick et al. |
| 4,391,659 A | * | 7/1983 | Smith .................... C06B 47/145 149/2 |
| 4,623,678 A | * | 11/1986 | Moore ...................... C08C 1/14 260/DIG. 22 |
| 6,342,257 B1 | * | 1/2002 | Jacobson ............. A23C 9/1522 426/522 |
| 9,661,864 B2 | * | 5/2017 | Barendse ............. A23D 7/0056 |
| 2003/0125421 A1 | * | 7/2003 | Bladel ....................... C08F 6/16 523/310 |
| 2003/0212168 A1 | * | 11/2003 | White ..................... C08L 95/00 524/59 |
| 2005/0197415 A1 | * | 9/2005 | Desmarais ................. C08J 9/28 521/64 |
| 2012/0003377 A1 | * | 1/2012 | Dobenesque ........ A23D 7/0056 426/602 |
| 2016/0213018 A1 | * | 7/2016 | Den Adel .............. A23D 7/001 |
| 2016/0242429 A1 | * | 8/2016 | Arends .................. A23D 7/001 |

FOREIGN PATENT DOCUMENTS

| | | | | |
|---|---|---|---|---|
| GB | 1327511 | 8/1973 | | |
| WO | WO2005014158 | 2/2005 | | |
| WO | WO2013171027 | 11/2013 | | |
| WO | WO-2015052026 A1 | * | 4/2015 | ............... A23D 9/05 |
| WO | WO2015052037 | 4/2015 | | |

OTHER PUBLICATIONS

Search Report and Written Opinion in PCTEP2016059732, dated Jun. 23, 2016.
Search Report and Written Opinion in EP15169579, dated Jul. 28, 2015.

* cited by examiner

*Primary Examiner* — Nikki H. Dees
*Assistant Examiner* — Changqing Li
(74) *Attorney, Agent, or Firm* — Arentfox Schiff LLP

(57) ABSTRACT

A process for the preparation of an edible fat slurry containing oil and solid fat particles of hardstock fat, in which said slurry is made by adding a melted hardstock fat to cold liquid oil in a vessel over a period of time. The invention also relates to a process for turning such slurry into an oil-continuous emulsion.

18 Claims, No Drawings

PROCESS FOR PREPARING FAT SLURRIES AND A PROCESS FOR PREPARING EMULSIONS OF SUCH SLURRIES

FIELD OF INVENTION

The present invention relates to a process for the preparation of an edible fat slurry containing oil and solid fat particles of hardstock fat, and to a process for turning such slurry into an oil-continuous emulsion. More specifically, the invention relates to a process in which said slurry is made by adding a melted hardstock fat to cold liquid oil in a vessel over a period of time in such a way that the concentration of the hardstock fat in the liquid oil increases.

BACKGROUND OF INVENTION

Edible water-in-oil emulsions, which comprise a continuous fat phase and a dispersed aqueous phase, are well known in the art and include for example margarine.

The fat phase of margarine and similar water-in-oil emulsions is typically a mixture of liquid oil (i.e. fat that is liquid at ambient temperature) and fat which is solid at ambient temperatures. The solid fat, also called structuring fat or hardstock fat, serves to structure the fat phase and helps to stabilize the aqueous phase (e.g. in the form of droplets) by forming a fat crystal network. Ideally the structuring fat has such properties that it melts or dissolves at mouth temperature otherwise the product may have a heavy and/or waxy mouthfeel.

Margarine is generally defined as a composition containing at least 80 wt. % fat and about 20 wt. % aqueous phase. In contrast, emulsions containing less than 80 wt. % fat are generally called spreads. Nowadays the terms margarine and spread are sometimes used interchangeably although in some countries the commercial use of the term margarine is subject to certain regulatory requirements. For the purpose of the present invention the terms margarine and spread will be used interchangeably.

In the market place margarine is generally sold as one of three principal types of water-in-oil emulsion:
  hard or stick margarine (also referred to as wrappers);
  (typically softer) tub margarine (typically named "spreads)"; and
  liquid or pourable margarine.

Wrapper margarines and tub margarines are non-pourable and generally contain a higher amount of hardstock fat than liquid or pourable margarines.

The general process for the manufacture of water-in-oil emulsions, using the votator or churn process, encompasses the following steps:
1. Mixing of the liquid oil, the hardstock fat and the water-phase at a temperature at which the hardstock fat is definitely liquid;
2. cooling of the mixture under high shear to induce crystallization of the hardstock fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158. A disadvantage of such process is that it requires heating up and cooling the whole formulation, e.g. including all oil and all water. This costs a lot of energy.

An alternatives to the votator or churn process for the manufacture of margarines which is known involves the use of fat powder comprising hardstock fat (i.e. pre-crystallized fat) (WO 2005/014158). The fat powder used in such process is also known as ScMM powder (super critical melt micronisation) or PGSS particles (particles from gas saturated solutions). Spreads can be made by blending at ambient or colder temperature liquid oil, the fat powder and an aqueous phase. This overcomes having to heat and cool the entire formulation. Disadvantages of such process relate e.g. to the need for equipment which is new in margarine and spreads making (pressurizing and handling $CO_2$, spraying melted fat, handling fat powder), capital expentidure. Also, the method seems to be less attractive for high-fat products (e.g. 70-85%).

A further alternative for making spreads is known e.g. from GB1327511. This reference discloses a process for the preparation of low-calorie spreads by mixing a first liquid (which is at a temperature of at least 28° C.) which consists of a fat phase containing crystallisable material with a second liquid (which is at a temperature of at most 8° C.) which is substantially free from crystallisable material. At least part of the second liquid is composed of the aqueous phase, and oils which are liquid at 2° C. are preferably present in this second liquid. The two liquids are fed separately to a high pressure dosing pump, allowing continuous dosing of the liquids together.

U.S. Pat. No. 3,472,661 discloses a process for preparing liquid margarines, by a process in which a liquid vegetable oil is blended with a thickening agent (a high melting fat), an emulsifier and a phosphatide, and chilling the blend to a point at which it partially crystallises, followed by holding for at least five hours and then vigorously agitating the blend to obtain a uniform dispersion of the fat crystals. The aqueous phase is then added to the fat phase.

Edible non-pourable fat-continuous emulsions like margarines and spreads need to have a certain firmness (also called hardness), and a good emulsion stability. Smaller water droplets lead to increased emulsion stability. A small droplet size is also important to maintain microbiological stability. Firmness is usually expressed as a Stevens value (see under "Examples" for how such can be measured). The droplet size is usually expressed as d3,3 value (see under "Examples" for how such can be measured). A desired droplet size is from 2 to 8 microns with an e-sigma ideally below 2.2. The Stevens value for spreadable edible dispersions is above 60, preferably above 80, more preferably above 100.

There is a desire for a process for making edible oil-continuous emulsions, e.g. non-pourable of the margarine or spread type and pourable such as liquid margarines, which emulsions are easy to manufacture, without the need for making or including (micronized) fat powders, and which do not need heating up and cooling of the complete oil and fat phase like votator processes, yet which process yields emulsions which have a good firmness (as expressed by Stevens value) and a small droplet size. Preferably, the Stevens value and droplet size should be closer to the Stevens value and droplet size made by the process involving micronized fat powder than when made by a process similar as GB1327511 (when all net formulations are the same).

SUMMARY OF THE INVENTION

It has now been found that the above may be achieved, at least in part, by a process for preparing a fat slurry comprising liquid edible oil and solid fat particles of hardstock fat, which process comprises the steps of:
  a. providing a vessel comprising a liquid oil at a temperature of below 20° C.;
  b. providing a melted hardstock fat at a temperature of above 35° C.;
  c. adding over a period of from 0.5 to 60 minutes under mixing the melted hardstock to the liquid oil in the vessel, such that the concentration of hardstock fat in the liquid oil at the point of mixing of hardstock fat and liquid oil increases in said period from less than 10% of the final concentration to at least 90% of the final concentration of hardstock fat in the liquid oil;
  wherein the temperature of the liquid oil and the temperature of the melted hardstock are chosen such that the temperature of the resulting mixture of liquid oil and hardstock fat after addition of all of the hardstock fat is below 30° C.

A slurry of liquid edible oil and solid fat particles of a hardstock fat is not yet an oil-continuous emulsion (solid and spreadable like a margarine or spread, liquid like a liquid margarine). However, such slurry can easily be turned into such oil-continuous emulsion by mixing with an aqueous phase. Hence, the present invention further relates to a process for making an edible oil-continuous emulsion comprising 20-85% fat and oil, which process comprises mixing an aqueous phase and a fat slurry, wherein the fat slurry is prepared in a process according to the present invention and as set out above and below.

Although the preparation of the slurry of oil and melted hardstock fat is preferably carried out batch-wise, the mixing of the fat slurry with the aqueous phase is preferably done continuously, e.g. in C-units or pin-stirrers as are known in margarine processing. Preferably, the temperature of the slurry remains below 30° C., more preferably below 25° C., even more preferably below 20° C., prior to mixing with the aqueous phase to form an emulsion.

DETAILED DESCRIPTION OF THE INVENTION

Weight percentage (wt. %) is based on the total weight of the composition unless otherwise stated.

The terms 'fat' and 'oil' are used interchangeably. Where applicable the prefix 'liquid' or 'solid' is added to indicate if the fat or oil is liquid or solid at ambient temperature as understood by the person skilled in the art. Ambient temperature is considered to be a temperature of about 20 degrees Celsius. Hardstock fat refers to a fat that is solid at ambient temperature as understood by the person skilled in the art. The terms 'hardstock fat', 'structuring fat' or 'hardstock' are used interchangeably.

In "concentration of hardstock fat in the liquid oil" as used herein, the part "concentration of hardstock fat" is meant to be the sum of melted hardstock fat, dissolved hardstock fat, and crystallised hardstock fat, and any other form of hardstock fat that has been added to the liquid oil.

Making slurries containing liquid edible oil and hardstock fat crystals can be done by various processes, such as the process as set out in WO 2005/014158, which is also known as the ScMM-process (super critical melt micronisation, which produces fat powder which is stirred with oil). Another process blends in a continuous way cold oil and melted hardstock fat, in which process both streams are mixed in a fixed ratio (the desired end ratio). That does give a slurry, but it was found that with the present process spreadable emulsions can be obtained with higher firmness (as expressed by a higher Stevens value), and/or smaller droplet size, and/or better cycle stability. The process of the present invention is characterized by a gradient in the concentration of hardstock fat in the oil slurry, e.g. going from zero or low to (close to) the end concentration The process as set out above can conveniently be carried out as a batch process, e.g. in which to a vessel of cold liquid oil the melted hardstock fat is gradually added under continuous stirring, e.g. over a time interval of from 30 seconds to 60 minutes. More preferably, in the present process the melted hardstock fat is added to the oil during a time interval of between 3 and 30 minutes. Following the above, it may be preferred that the process according to the present invention is carried out batch wise.

A suitable batch process is one in which the vessel containing the oil is equipped with a recycle loop, and wherein the melted hardstock fat is added to the liquid oil in the recycle loop. The recycle loop performs part of the mixing, but is also a convenient location for adding the melted hardstock fat, as a small stirrer can be positioned in the recycle loop at the point (or just thereafter) where the melted hardstock fat is added. Hence, it is preferred, when a recycle loop is present as part of the oil vessel, that the recycle loop is equipped with a mixer, and wherein the melted hardstock fat is added to the oil in the recycle loop in or before the mixer. An example of a suitable mixer in the recyle loop is a dynamic in-line mixer.

There are processes known in which the melted hardstock fat is added to a mixture of cold oil and cold water (i.e. to an emulsion, be it water continuous or oil continuous). This is not preferred in the present invention, e.g., when wishing to produce emulsifier-free spreads. Hence, in the process according to the present invention it is preferred that the liquid oil in the vessel in step a. prior to mixing with the melted hardstock fat is substantially free from water.

In the process according to the present invention, it is preferred (e.g. for reasons of structuring an emulsion, but also for being able to handle the slurry), that the total amount of melted hardstock fat added to the liquid edible oil is from 1.5 to 40% by weight on the resulting fat slurry, preferably from 3 to 30% by weight on the resulting fat slurry.

As mentioned, the liquid oil should be cold enough to provide sufficient cooling capacity for the melted hardstock fat added to cool to below its melting point, so that it can crystallise in the oil to form the slurry. The actual temperature of the oil will depend e.g. on the amount of hardstock fat that is added to the slurry and its temperature and on the crystallization temperature of the hardstock. Depending on such, the temperature of the oil in the vessel in step a) is preferably between 2 and 20° C., more preferably between 5 and 15° C. The actual temperature needed can easily be determined by routine experimentation.

For ease of making the emulsions and/or for stability, it may be preferred that the fat slurry comprises a monoglyceride emulsifier. Such emulsifier can be conveniently included in the slurry by mixing it with the oil prior to combining oil and melted hardstock fat. Hence, in the present invention it is preferred that the fat slurry contains 0.01 to 0.8% of a monoglyceride emulsifier by weight based on the slurry, which monoglyceride emulsifier is mixed with the oil in step a.

The hardstock fat added should be melted (i.e. in liquid form). Hardstock fats for most emulsions, especially those directly eaten like spreads (in contrast to those that are heated and eaten at elevated temperatures, e.g. like a sauce base), are mostly melted at temperatures in the range of 30-35° C. However, such hardstock fats have a melting trajectory, and frequently they are fully melted only at temperatures above 50° C. The temperature of the hardstock fat added to the oil is preferably just above such, so that it is fully liquid. Hence, it may be preferred that the temperature of the melted hardstock fat in step b) of the present process is between 35 and 80° C., preferably between 40 and 75° C. The lower the better (as long as it is fully melted), generally, but such will also depend on the amount of hardstock fat added to the oil.

The person of average skill in the art can play with the temperatures of the oil and the melted hardstock, as long as the melted hardstock is fully melted prior to addition to the oil, and provided the temperature of the combined product of oil plus hardstock remains below the melting point of the hardstock fat. In view of the hardstock fats used e.g. for spreadable emulsions, it is preferred that the temperature of the liquid oil and the temperature of the melted hardstock fat are chosen such that the temperature of the resulting fat slurry after addition of all of the hardstock fat is below 25° C. Preferably, the temperature of the resulting fat slurry is at least 10° C. below the melting point of the hardstock chosen, more preferably at least 20° C. below the melting point of the hardstock chosen.

EXAMPLES

Examples A, B and C

Three alternative ways of making a fat slurry comprising oil and fat crystals were executed, and with these slurries oil-continuous emulsions of the spread-type were prepared, and some properties (droplet size, firmness) of the resulting spreads were measured and compared. All experiments were done with exactly the same formulation (same fat slurry and same emulsion compositions) but they varied in the way the fat slurry was made.

The fat slurry (after preparation) contained 87% sunflower oil, 13% hardstock, erES48, 0.4% monoglycerides, 0.05% lecithin and 0.1% of a 1% B-carotene solution. The oil-continuous emulsion after preparation had the overall com position as in table 1. The monoglycerides were included in the composition by first mixing such with the sunflower oil.

TABLE 1

| overall emulsion composition | |
|---|---|
| Sunflower oil | 38.9% |
| erES48 hardstock | 5.85% |
| Monoglycerides | 0.2% |
| Lecithin | 0.025% |
| B-carotene (1% solution) | 0.05% |
| Water | 54.9% |
| Salt | 0.1% |

The fat slurry was prepared in three different ways, as identified by process A, process B and process C below (in other words: three different slurries were prepared, of the same overall composition but different processing steps). Each of the three slurries was processed into an oil-continuous emulsion (a spread) with the same overall composition, and by the same processing (as set out below). The three resulting spreads were analysed on several properties, and as the overall composition is the same and the processing of the slurry into the emulsion is the same, any differences in the resulting spreads must have been due to the different processes for making the fat slurries.

Process A: ScMM

In this process for example A hardstock crystallization and mixing with oil are carried out in separate sequential steps. First the fat powder was made with the process as known as supercritical melt micronisation. More specifically, the micronized fat powder was made according to the method as described in EP 1651338B1. Thereafter a fat slurry was made by blending the fat powder so-obtained with the vegetable oil, by adding oil to a tank which contained the desired portion of fat powder and mixing (partly under vacuum).

Process B: Melted Hardstock and Cold Oil—Continuous

In this process for example B the hardstock fat crystals were made by contacting melted hardstock with cold oil. The cold oil cools the melted hardstock and effects crystallization of the hardstock fat, and at the same time the mixture of the hardstock fat crystals with oil is formed thus constituting the slurry. This was effected by mixing warm melted hardstock (at a temperature of 70° C.) with cold oil (temperature 7° C.) in a continuous way. The warm hardstock was added to the cold oil in the mixing chamber of a Fluid Dynamic Mixer in a fixed ratio hardstock:oil=13:87=1:6.7.

Process C: Melted Hardstock and Cold Oil—Batch-Wise

In this process for example C, like for process B, the hardstock fat crystals were made by contacting melted hardstock with cold oil. Difference with process B is however, that this was not done as a continuous process, but by one in which to a tank with the cold oil (temperature 7° C.) gradually melted hardstock is added.

In this process, a tank was filled with 87 kg of cold oil. The content of the tank was recirculated over the tank via an external mixer located in a recycle loop with a flowrate of 3000 kg/h. Just before the mixer in the recycle loop 13 kg of the hardstock was added to the cold oil with a flowrate of 156 kg/h (i.e. duration 5 minutes). This means that initially there was in the tank a ratio hardstock:oil=1:19, which gradually changed to the final ratio hardstock:oil of 1:6.7.

Processing of Slurry into Emulsion

Spreads were made out of these three different types of slurries by adding the slurry and an aqueous phase containing the remaining ingredients together just before a C-unit which was operated at four different rpm's. The resulting products were packed in 250 g tubs and stored at 5° C. for 10 weeks.

Analysis

The firmness and water droplet size of the emulsions were determined as follows.

Water Droplet Size Distribution of W/O Emulsions

The normal terminology for Nuclear Magnetic Resonance (NMR) is used throughout this method. On the basis of this method the parameters d3,3 and exp($\sigma$) of a lognormal water droplet size distribution can be determined. The d3,3 is the volume weighted mean droplet diameter (in microns, in the present case) and $\sigma$ (e-sigma) is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the log-normal droplet size distribution—the parameters of the water droplet size distribution d3,3 (volume weighed geometric mean diameter) and a (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

Stevens Value

Stevens values indicates a products hardness or firmness. The Stevens value was measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode.

Temperature of the sample: 5° C. The probe is pushed into the product at a speed of 2 mm/s, a trigger force of 5 gram from a distance of 10 mm. The force required is read from the digital display and is expressed in grams.

Results

Table 2 below lists the results of the droplet size measurements d3,3 (microns) and Stevens value of all products after 10 weeks storage.

TABLE 2 droplet sizes and Stevens values examples A-C

| C-unit rpm | | 1000 | 1500 | 2000 | 2500 |
|---|---|---|---|---|---|
| Process A | d3,3 | 6.07 | 3.62 | 2.79 | 2.50 |
| | Stevens | 117 | 135 | 150 | 129 |
| Process B | d3,3 | 23.70 | 7.90 | 5.12 | 3.96 |
| | Stevens | 51 | 58 | 51 | 44 |
| Process C | d3,3 | 7.79 | 4.24 | 3.10 | 2.59 |
| | Stevens | 108 | 122 | 127 | 150 |

These results clearly show that the spreads produced via process A and C are very comparable in terms of d3,3 (droplet size) and Stevens value (firmness). The spreads produced via process B have larger droplets and are much softer. Also after temperature cycling all spreads produced via process A and C were stable, whereas the spreads produced via process B were not stable.

In the '6-cycle' spreads were stored for 2 days at 25 degrees Celsius, followed by 4 days at 15 degrees Celsius, followed by 1 day at 10 degrees Celsius before being measured.

In the 'C-cycle' spreads were stored for 2 days at 30 degrees Celsius, followed by 4 days at 15 degrees Celsius, followed by 1 day at 10 degrees Celsius before being measured.

Table 3 below shows the temperature stability results. Stable indicates that the emulsion after temperature cycling was still intact. Unstable indicates that the emulsion after temperature cycling was broken.

TABLE 3 temperature stability results examples A-C

| c-unit rpm | | 1000 | 1500 | 2000 | 2500 |
|---|---|---|---|---|---|
| Process A | B cycle | stable | stable | stable | stable |
| | C cycle | stable | stable | stable | stable |
| Process B | B cycle | unstable | unstable | unstable | unstable |
| | C cycle | unstable | unstable | unstable | unstable |
| Process C | B cycle | stable | stable | stable | stable |
| | C cycle | stable | stable | stable | stable |

Examples D-H

Next to examples A-C, additional experiments were performed (D to H), which were conducted in the same way as for example C (process C), but with variations in temperature of the oil and/or hardstock, the recirculation flowrate in the recycle loop, and the speed of the mixer when making the slurry.

TABLE 4 process variables examples D-H

| | T oil | T hardstock | Recirculation flowrate | Mixer RPM |
|---|---|---|---|---|
| default | 7 | 70 | 3000 kg/h | 3000 rpm |
| D | Default | Default | 1200 | Default |
| E | Default | Default | 2100 | Default |
| F | Default | Default | Default | 900 rpm |
| G | 12 | Default | Default | Default |
| H | Default | 88 | Default | Default |

The resulting emulsions were analysed in the same way as the examples A-C. The results are set out below in table 5.

TABLE 5 results examples D-H

| | d3,3 | Stevens | B-cycle | C-cycle |
|---|---|---|---|---|
| D | 2.6 | 106 | stable | Stable |
| E | 2.9 | 98 | @ | unstable |
| F | 3.3 | 57 | @ | @ |
| G | 2.7 | 102 | @ | @ |
| H | 3.1 | 96 | stable | stable |

@ indicates some oil exudation

The invention claimed is:

1. A process for preparing an emulsion comprising liquid edible oil and solid fat particles of hardstock fat, which process comprises the steps of:
   a) providing a vessel comprising a liquid oil at a temperature of below 20° C.;
   b) providing a melted hardstock fat at a temperature of above 35° C., wherein the hardstock fat is not a fat powder;
   c) forming a fat slurry by adding at least a portion of the melted hardstock fat to the liquid oil in the vessel, gradually over a period of from 0.5 to 60 minutes, with continuous mixing, such that the concentration of hardstock fat in the liquid oil increases during said period from less than 10% to at least 90%; and
   d) forming an emulsion by mixing the fat slurry with an aqueous phase;
   wherein the temperature of the liquid oil and the temperature of the melted hardstock fat are chosen such that the temperature of the fat slurry remains below 20° C. during steps c); and
   wherein the vessel is equipped with a recycle loop, and wherein the melted hardstock fat is added to the liquid oil in the recycle loop.

2. The process of claim 1, wherein the process is carried out batchwise.

3. The process of claim 1, wherein the liquid oil in the vessel in step a) prior to mixing with the melted hardstock fat is substantially free of water.

4. The process of claim 1, wherein the melted hardstock fat is gradually added to the oil over a time interval of between 3 and 30 minutes.

5. The process of claim 1, wherein the total amount of melted hardstock fat added to the liquid edible oil is from 1.5 to 40% by weight of the resulting fat slurry.

6. The process of claim 1, wherein the temperature of the oil in the vessel in step a) is 2° C. or more to less than 20° C.

7. The process of claim 1, wherein the temperature of the melted hardstock fat in step b) is greater than 35° C. to up to 80° C.

8. The process of claim 1, wherein the temperature of the liquid oil and the temperature of the melted hardstock fat are chosen such that the temperature of the resulting fat slurry after addition of all of the hardstock fat is below 25° C.

9. The process of claim 1, wherein the recycle loop is equipped with a mixer, and wherein the melted hardstock fat is added to the oil in the recycle loop in or upstream of the mixer.

10. The process of claim 9, wherein the mixer is a dynamic in-line mixer.

11. The process of claim 1, wherein the fat slurry contains 0.01 to 0.8% of a monoglyceride emulsifier by weight based on the slurry, and the monoglyceride emulsifier is mixed with the oil in step a).

12. The process of claim 1, wherein the total amount of melted hardstock fat added to the liquid edible oil is from 3 to 30% by weight of the resulting fat slurry.

13. The process of claim 1, wherein the temperature of the oil in the vessel in step a) is between 5 and 15° C.

14. The process of claim 1, wherein the temperature of the melted hardstock fat in step b) is between 40 and 75° C.

15. The process of claim 1, wherein the liquid oil in the vessel in step a) prior to mixing with the melted hardstock fat comprises less than 5% water.

16. The process of claim 1, wherein the fat slurry does not contain fat powder.

17. The process of claim 1, wherein the fat slurry is not formed from fat powder.

18. The process of claim 1, wherein the temperature of the slurry is at least 20° C. below the melting point of the hardstock fat.

\* \* \* \* \*